W. HODGES.
Frying-Pan.

No. 217,378. Patented July 8, 1879.

Witnesses
William J. Cooper.
Harry Smith

Inventor
William Hodges
by his Attorneys
Howson and Son

UNITED STATES PATENT OFFICE.

WILLIAM HODGES, OF PHILADELPHIA, PENNSYLVANIA.

IMPROVEMENT IN FRYING-PANS.

Specification forming part of Letters Patent No. 217,378, dated July 8, 1879; application filed June 2, 1879.

*To all whom it may concern:*

Be it known that I, WILLIAM HODGES, of Philadelphia, Pennsylvania, have invented a new and useful Improvement in Frying-Pans, of which the following is a specification.

My invention consists of the combination of a frying-pan with a perforated receptacle and with a hooked support, to which the said receptacle can be suspended above the pan when the fat has to be drained from the cooked potatoes, oysters, or other articles of diet in the said receptacle, as described hereinafter.

Figure 1:
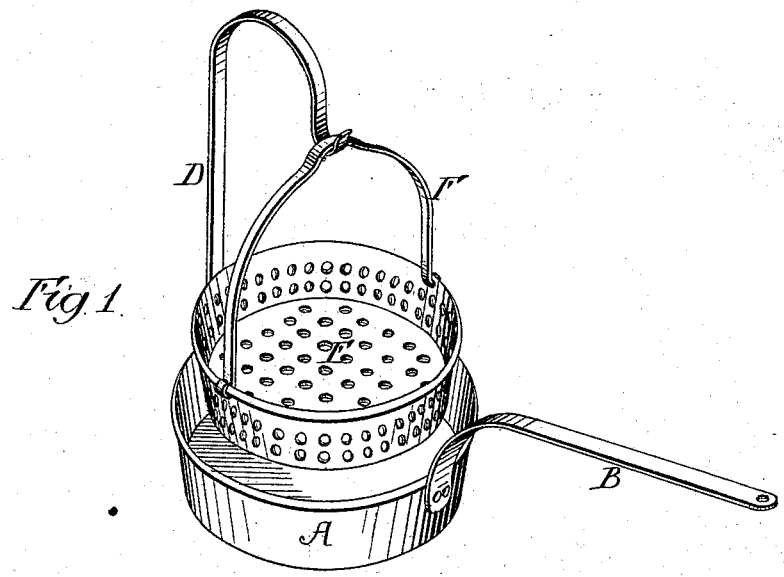
Figure 2:
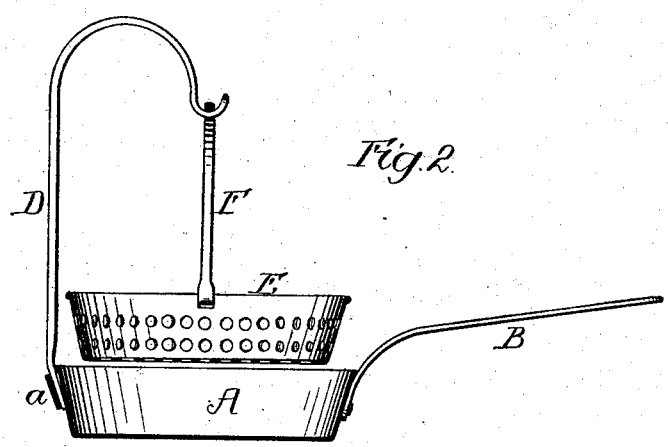

In the accompanying drawings, Figure 1 is a perspective view of my improved frying-pan, and Fig. 2 a vertical section of the same.

The body A of the pan is of the usual form, and is provided with the usual handle B.

At the rear edge of the body is formed a socket, $a$, for the reception of the lower end of the detachable support D, the upper end of which is curved and terminates in a hook situated above the center of the pan. A vessel, E, perforated at the bottom and sides, is arranged to fit freely in the pan, and is provided with a bail, F.

In using the pan for frying, the perforated vessel, containing the potatoes, oysters, or other articles of diet, is placed on the bottom of the pan, and when the food is cooked and it is desirable to strain the fat from the same, the perforated vessel is raised from the pan and suspended from the hooked support. The lower end of this support is so fitted to the socket that it can be detached therefrom when the pan has to be used without the perforated vessel; but, if desired, the said lower end of the support may be riveted or otherwise permanently secured to the pan.

I claim as my invention—

1. The combination of the frying-pan and its support D with the perforated vessel E and its bail, all substantially as set forth.

2. The combination of the perforated vessel E and its bail F with the pan A, having a support, D, detachable from the pan, all substantially as specified.

In testimony whereof I have signed my name to this specification in the presence of two subscribing witnesses.

WILLIAM HODGES.

Witnesses:
WILLIAM J. COOPER,
HARRY SMITH.